United States Patent [19]

Miller et al.

[11] Patent Number: 4,901,067

[45] Date of Patent: Feb. 13, 1990

[54] INTERFACE CIRCUIT FOR USE IN A PROGRAMMABLE MESSAGE DISPLAY

[75] Inventors: Robert L. Miller; Leon C. Brower, both of Davenport, Iowa

[73] Assignee: Uticor Technology, Inc., Bettendorf, Iowa

[21] Appl. No.: 186,383

[22] Filed: Apr. 26, 1988

[51] Int. Cl.⁴ .............................................. G09G 3/00
[52] U.S. Cl. ..................................... 340/811; 340/756
[58] Field of Search ............... 340/700, 811, 813, 789, 340/756, 812

[56] References Cited

U.S. PATENT DOCUMENTS

| | | | |
|---|---|---|---|
| 4,100,460 | 7/1978 | Spence | 340/811 |
| 4,271,409 | 6/1981 | Filliman | 340/811 |
| 4,295,138 | 10/1981 | Nakauchi et al. | 340/811 |
| 4,535,329 | 8/1985 | Koyanagi et al. | 340/812 |

*Primary Examiner*—Gerald Brigance
*Attorney, Agent, or Firm*—Brooks & Kushman

[57] ABSTRACT

An interface circuit for reading data to a programmable message display is provided wherein input power is reduced through sampling techniques and circuit complexity is reduced through multiplexing. Stable operation is providing in the presence of noise when the interface circuit is coupled to a device, such as a programmable controller. The circuit includes a plurality of input circuits which receive and condition a like plurality of parallel input data signals. A reference signal generating circuit is responsive to control signals from a microprocessor of the display to provide reference signals. A like plurality of comparator circuits are coupled to their responsive input circuits and to the reference signal generating circuit. Different banks of the comparator circuits sequentially compare the conditioned input signals with the reference signals. Isolation circuits are coupled to the outputs of the comparator circuits. In particular, each of the isolation circuits is coupled to the output of a single comparator circuit of each of the banks of comparator circuits to provide isolated output signals to the microprocessor which correspond to the level of the input data signals received by the input circuits.

18 Claims, 4 Drawing Sheets

INTERFACE CIRCUIT FOR USE IN A PROGRAMMABLE MESSAGE DISPLAY

TECHNICAL FIELD

This invention relates to interface circuits for use in programmable message displays and, in particular, to interface circuits for use in programmable message displays wherein input power is reduced through sampling techniques and circuit complexity is reduced through multiplexing.

BACKGROUND ART

Many electronic devices such as message displays require isolation between their inputs and their internal circuits. Process control systems often require many moderate voltage inputs operating in the presence of noise and leakage currents. Economy, size and power consumption are important considerations when designing an interface circuit that is utilized many times in the electronic design.

Practical input circuits provide noise and leakage rejection through the use of low-valued resistors operating under high-power conditions. The resulting high-power operation results in a physically large and costly system that is prone to failure due to heat.

DISCLOSURE OF THE INVENTION

One object of the present invention is to provide a low-power, low-cost, compact interface circuit for use in a programmable message display and having high voltage isolation and immunity to noise and leakage currents.

In carrying out the above object and other objects of the present invention, an interface circuit for reading data to a programmable message display is provided. The display includes a microprocessor for providing control signals, a message memory for storing multiple messages in a binary digital code and an electronic display device. The microprocessor is responsive to the output of the memory for causing the display device to display a message corresponding to the coded signal provided by the memory. The interface circuit includes a plurality of input circuits for receiving a like plurality of parallel input data signals. Each of the input circuits is responsive to an isolated control signal to condition its respective input data signal. The interface circuit further includes a reference signal generating means responsive to at least two control signals from the microprocessor to provide at least first and second reference signals. A like plurality of comparator circuits are provided wherein each of the comparator circuits is coupled to its respective input circuit and the reference signal generating means. First and second banks of the comparator circuits sequentially compare their respective conditioned input signals with the first and second reference signals, respectively. At least first and second isolation circuits are provided wherein each of the isolation circuits is coupled to the output of a single comparator circuit of each of the banks of the comparator circuits. The isolation circuits provide isolated output signals to the microprocessor corresponding to the level of the input data signals received by the input circuits.

Preferably, each of the input circuits includes a voltage divider circuit coupled to a voltage supply to shift the input voltage range of the input data signals and further includes a terminating resistor for leakage currents.

Each of the comparator circuits preferably includes a comparator having an open collector to allow the coupling of several comparators from several banks to one of the isolation circuits. Each isolation circuit is preferably a single opto-coupler. The output of each opto-coupler is then read by the microprocessor to determine the voltage level of the input data signals to the interface circuit. The reference signals are preferably provided to the comparators by an isolated analog switch of the reference voltage means.

The advantages accruing to the use of the interface circuit are numerous. For example, power consumption is reduced due to sampling techniques and circuit complexity is reduced through multiplexing. This technique is readily expandable in both X and Y dimensions. Also, high voltage isolation is provided. Stable operation is further provided in the presence of noise. Moderate leakage in the driving circuit is ignored. Proper circuit operation is provided should the microprocessor fail with the inputs enabled. High circuit density results from reduced circuit complexity and low power operation. The interface circuit is furthermore adaptable to a wide variety of inputs.

The objects, features and advantages of the present invention are readily apparent from the following detailed description of the best mode for carrying out the invention when taken in connection with the accompanying drawings.

BEST MODE FOR CARRYING OUT THE INVENTION

Figure 1:
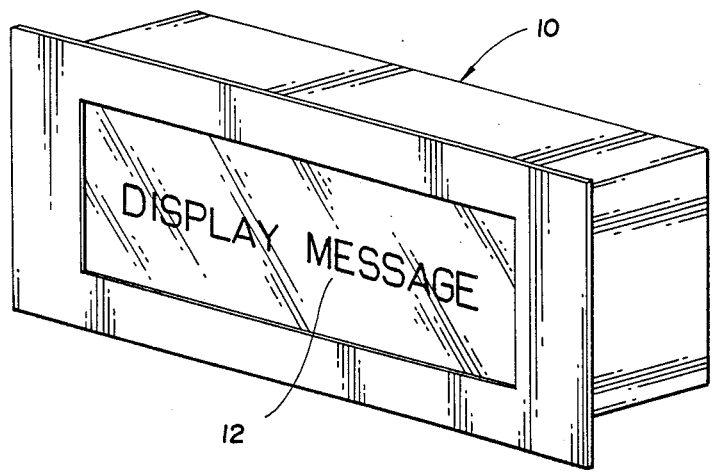
FIG. 1 is a perspective view of a programmable message display utilizing the interface circuit of the present invention.
Figure 2:
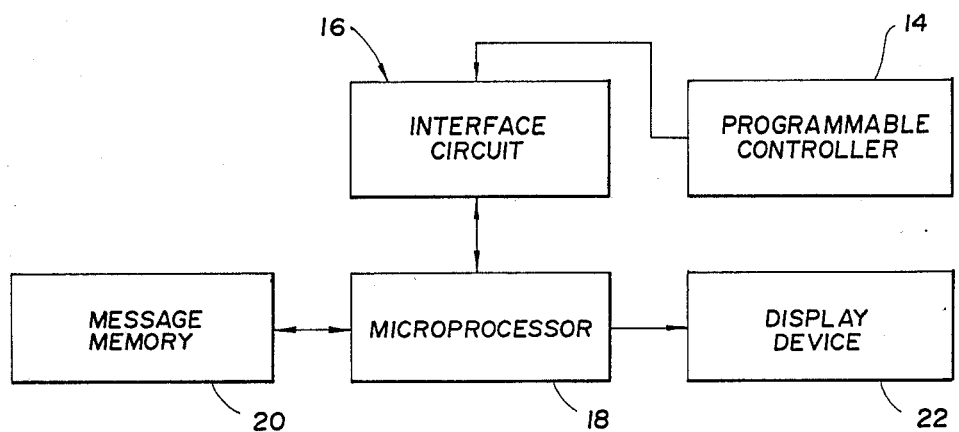
FIG. 2 is a block diagram of the programmable message display of FIG. 1 coupled to a programmable controller.

Referring now to FIG. there is illustrated a programmable message display, generally indicated at 10. The display 10 is adapted to convey information, for example, from an automated operation to various work stations in a manufacturing facility. The display 10 of FIG. 1 displays stored messages on four lines of 20 characters each. The display 10 includes a plurality of display elements in the form of vacuum fluorescent tubes 12 which form part of a display device 22, as shown in FIG. 2. The display device 22 typically includes circuitry (not shown) for selecting which ones of the tubes 12 are to be energized under control of a microprocessor 18 of the display 10.

As shown in FIG. 2, the programmable message display 10 is coupled to a programmable controller 14 at an interface circuit, generally indicated at 16. However, it is to be understood that other types of devices besides the programmable controller 14 may be utilized to input parallel input data signals to the programmable message display 10. The interface circuit 16 reads data input into the display 10 under control from the microprocessor 18 which preferably comprises a Motorola 68000 16-bit microprocessor.

The display 10 also includes a message memory 20 for storing multiple messages in a binary digital code. The microprocessor 18, in general, is responsive to the output of the message memory 20 for causing the display device 22 to display a message corresponding to the coded signal provided by the message memory 20.

Figure 3:
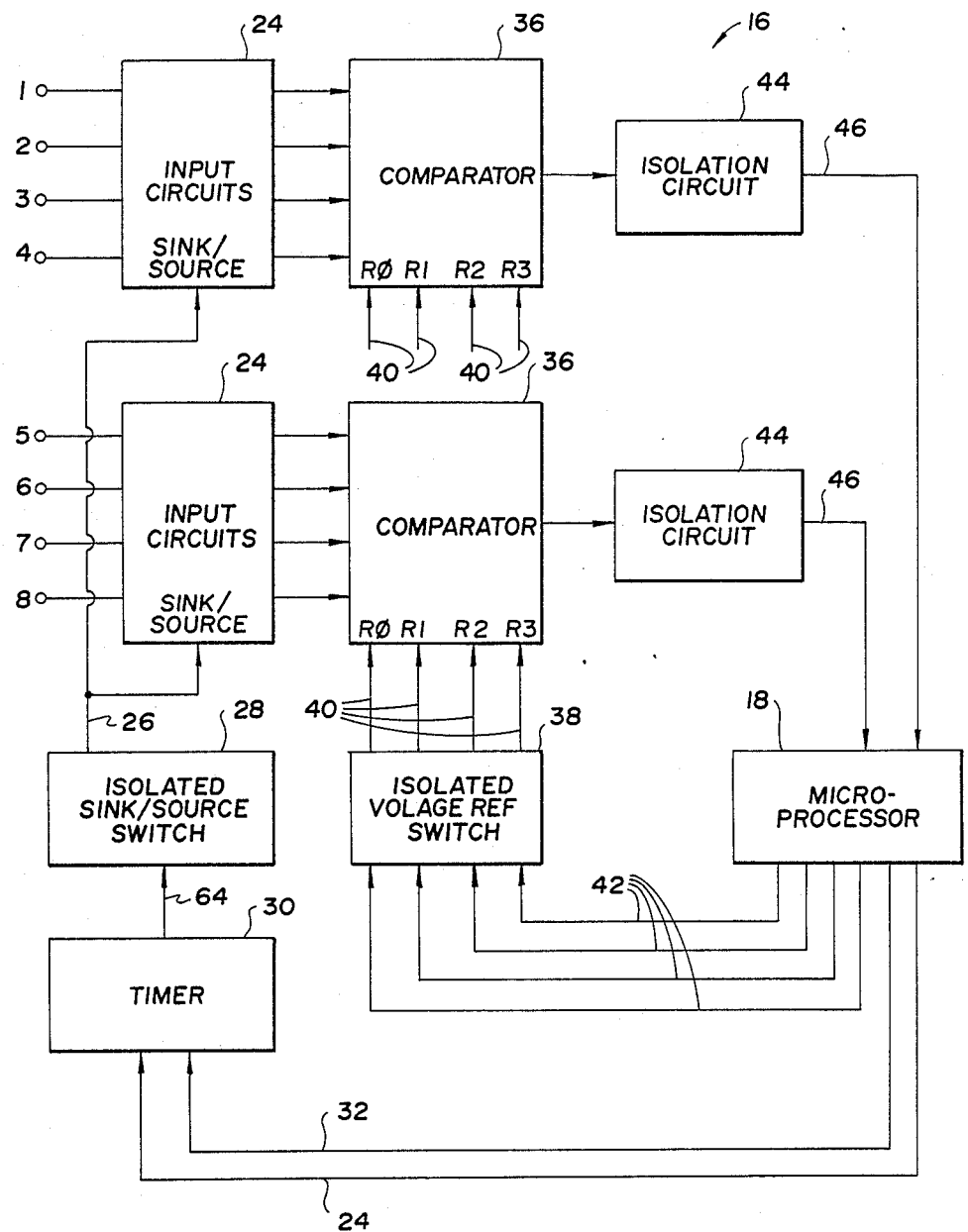
FIG. 3 is a general schematic diagram of the interface circuit.

Referring now to FIG. 3, there is illustrated in block diagram form the interface circuit 16. Preferably, 20 parallel input data lines are provided between the programmable controller 14 and the interface circuit 16. However, for purposes of simplicity only lines through 8 are shown and described hereinbelow.

A plurality of input circuits, one for each of the input data signals, are represented by blocks of input circuits 24. Each of the input circuits 24 receives one of the input data signals and is responsive to an isolated control signal along line 26 from an isolated sink/source switch 28 to condition its respective input data signal. A timer circuit 30 is coupled to the switch 28 and the microprocessor 18. The timer circuit 30 receives control signals along lines 32 and 34 from the microprocessor 18. In turn, the timer circuit 30 provides an output timing signal to the isolated sink/source switch 28 to control the input circuits 24.

The interface circuit 16 also includes banks of comparator circuits 36. Each of the comparator circuits 36 is coupled to its respective input circuit of the input circuits 24. In turn, each of the comparator circuits 36 is also coupled to an isolated voltage reference switch 38 along lines 40. The isolated voltage reference switch 38 is controlled along lines 42 coupled to the microprocessor 18 and receives control signals therefrom. In general, four banks of the comparator circuits 36 sequentially compare their respective conditioned input signals with the four reference signals appearing along lines 40.

The interface circuit 16 further includes isolation circuits 44 each of which is coupled to the output of a single comparator circuit of each of the banks of the comparator circuits 36. The isolation circuits 44 provide output signals along lines 46 to the microprocessor 18 which correspond to the level of the input data signals received on the input data lines 1 through 8.

Figure 4:
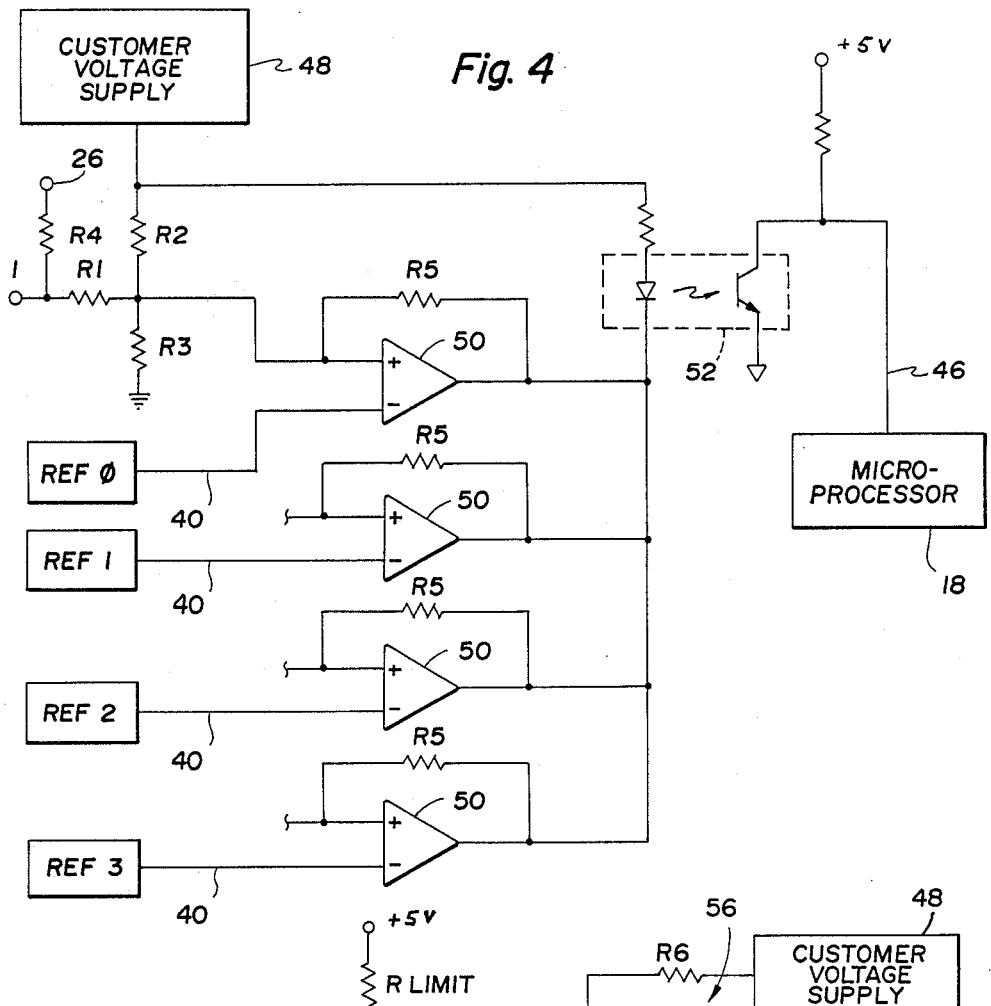
FIG. 4 is a detailed schematic diagram of input, comparator and isolation circuits of the interface circuit.

Referring now to FIG. 4, there is illustrated in detail, one of the input circuits 24, four of the comparator circuits 36 and one isolation circuit 44. Each block of the input circuits 24 includes four identical input circuits and each block of the comparator circuits 36 includes four identical comparator circuits. Only one of the input circuits 24 is illustrated in FIG. 4 for sake of simplicity.

Each of the input circuits 24 includes a voltage divider circuit including resistors R1, R2 and R3 having a common node and a terminating resistor R4 which couples the input circuit to the isolated sink/source switch 28 via line 26. The voltage divider circuit is biased by a customer's voltage supply 48 and shifts the input voltage range by attenuating the input signal. Preferably, the voltage divider circuit provides a voltage swing of approximately 25% to 75% of the value of the customer voltage supply 48.

The terminating resistors R4 are provided for leakage currents between the input circuits 24 and the isolated sink/source switch 28.

Each of the comparator circuits 36 includes a comparator 50, the positive input of which is provided with the conditioned input signal from its voltage divider circuit and the negative input of which is provided with a voltage reference signal along line 40. The comparator 50 provides active sensing of the scaled input voltage relative to the voltage reference appearing on its respective input line 40. Each voltage reference is itself scaled from the customer voltage supply 48 to provide a threshold that is a specific ratio to the customer voltage supply 48, as will be described in greater detail hereinbelow.

Each of the comparator circuits 36 also includes a hysteresis resistor R5 which is electrically connected to the positive input to the comparator 50 and the output of the comparator 50. In this way, the comparator 50 is provided with hysteresis to prevent unwanted oscillation and to avoid false triggering due to input noise.

The output of the comparator 50 is turned off with any valid input signal and the comparator's voltage reference input at ground level. The output of the comparator 50 is an open collector allowing wiring of other comparators of the block of comparators 36 in FIG. 4 to one of the isolation circuits 44 which preferably includes a single opto-coupler 52. The output of the opto-coupler 52 is read along line 46 by the microprocessor 18 to determine the level of the input data signals at the input of the interface circuit 16.

Figure 5:
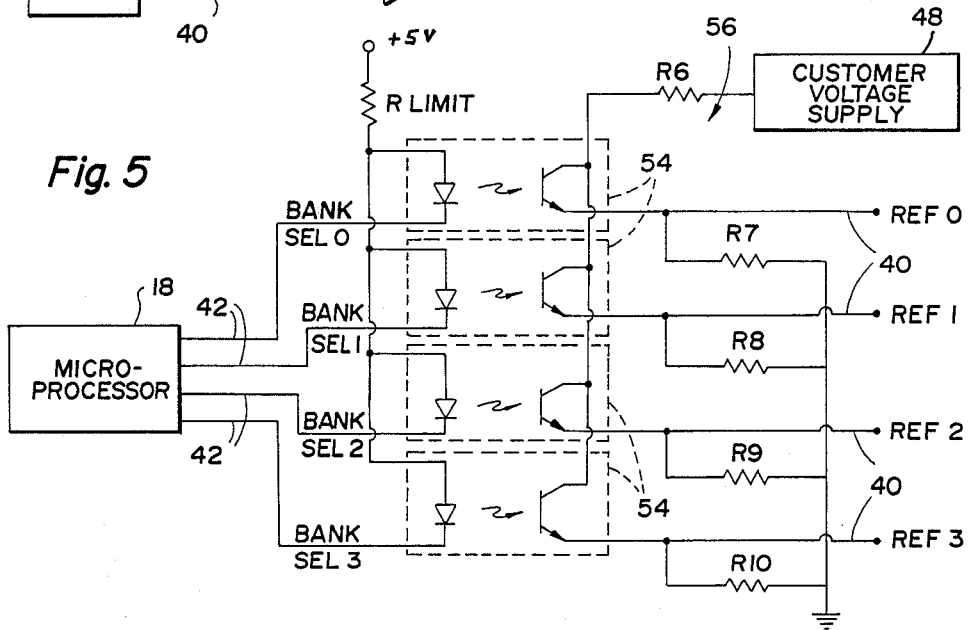
FIG. 5 is a detailed schematic diagram of an isolated voltage REF switch circuit of the interface circuit.

Referring now to FIG. 5, there is illustrated in detail the isolated voltage reference switch 38. The switch 38 is an isolated analog switch having four opto-couplers 54, one for each reference voltage level. The opto-couplers 54 drive a resistive voltage divider circuit, generally indicated at 56, which includes resistors R7, R8, R9 and R10. The outputs from the voltage divider circuit 56 is determined by the ratio of R6 to any one of the resistors R7 through R10. The resistor R6 is electrically connected to the customer voltage supply 48 so that the voltage reference is scaled from the customer voltage supply, as previously mentioned. In this way, a voltage threshold is provided as a specific ratio to the customer's voltage supply. Only one of the opto-couplers 54 is "on" at any one time as provided by control signals from the microprocessor 18 appearing on control lines 42.

Figure 6:
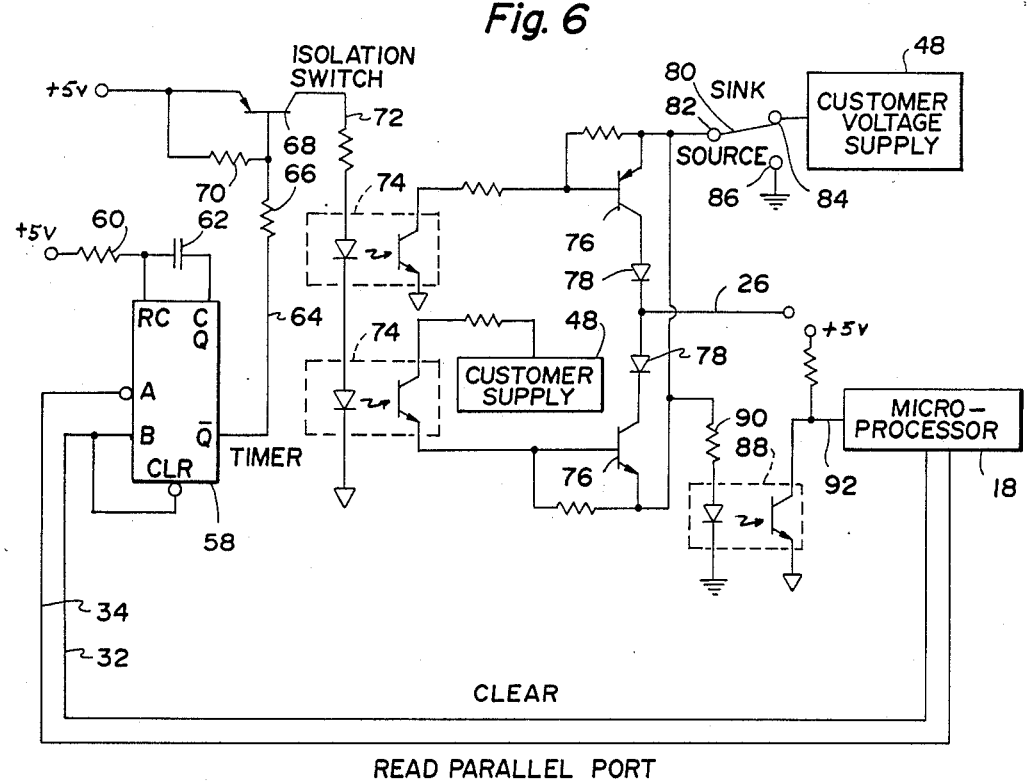
FIG. 6 is a detailed schematic diagram of timer and isolated sink/source switch circuits of the interface circuit.

Referring now to FIG. 6, the timer 30 preferably comprises a latch circuit 58, the A input of which receives a read parallel port signal on the line 34 and the B input of which receives a clear signal on the line 32. A resistor 60 and capacitor 62 are electrically connected to the latch 58 to provide a time constant for the timer 30 in a conventional fashion.

A timer signal appears on output line 64 and is electrically connected to a resistor 66 which, in turn, is electrically connected to the base of a transistor 68. A second resistor 70 is electrically connected between the emitter and the base of the transistor 68 so that the transistor 68 operates as a switch in response to the timer signal.

An isolated switch signal appears on line 72 which is electrically connected to the collector of the transistor 68.

A pair of opto-couplers 74 couple the isolated switch signal to the base of their respective transistors 76. The collectors of each of the transistors 76 re electrically connected to the line 26 through diodes 78 thereby providing a return path for the input terminating resistors R4 of the input circuits 24.

The collector of the transistor of each of the opto-couplers 74 may be biased from the customer voltage supply 48.

A jumper 80 comprises a selector mechanism for selecting either a sink mode or a source mode of operation for each of the input circuits 24. In particular, the jumper 80 connects a node 82 to either of nodes 84 and 86 to select the sink or source mode for the input circuits 24.

A monitor circuit including an opto-coupler 88 is coupled to the node 82 through a resistor 90 for monitoring the selection of the jumper 80 and provides a feedback signal along line 92 to the microprocessor 18. The feedback signal provides an indication of the polarity of the input data signals.

Figure 7:
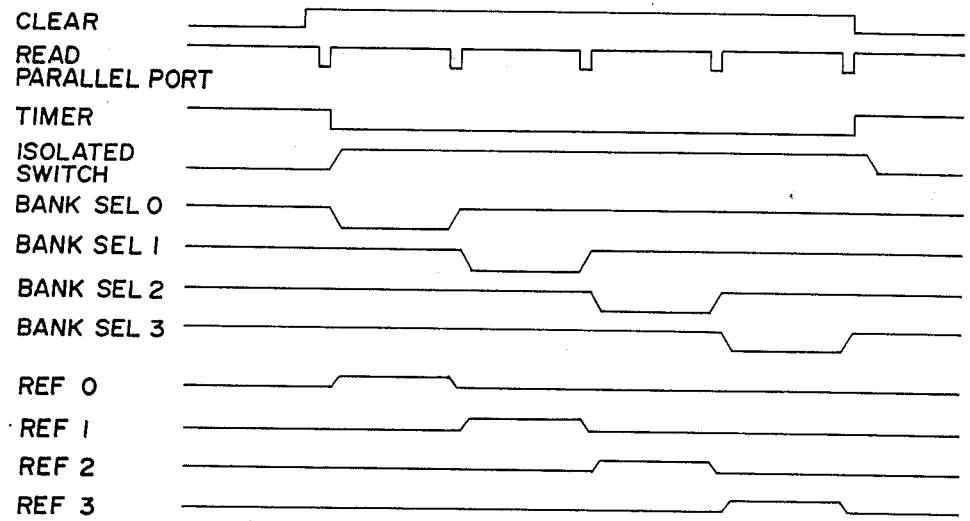
FIG. 7 is a timing diagram illustrating the operation of the interface circuit.

Referring now to FIG. 7, there are illustrated the timing diagrams for the operation of the interface circuit 16. In particular, the clear signal appearing on line 32 from the microprocessor 18 to the timer 30 is first turned off to allow for proper circuit operation.

Then the read parallel port signal is provided along line 34 to the timer 30 to start the timer 30 to enable the sink/source switch 28 to operate.

A bank zero reference signal is enabled to allow the comparators 36 in one bank of comparators 36 to operate. A time delay is generated to allow the interface circuit 16 to settle. After the delay, the corresponding inputs for the one bank of comparators 36 are read by the microprocessor 18 through the isolation circuits 44.

Then the bank zero reference signal is turned off and the bank 1 reference signal is enabled. After a longer time delay again to let the interface circuit 16 to settle, the next bank inputs are ready to be read by the microprocessor 16.

At the conclusion of all of the reads by the microprocessor 18, the clear signal is made active and the isolated sink/source switch 28 is disabled. This feature allows low power operation of the input circuits 24 while providing good leakage current rejection.

The advantages accruing to the use of the interface circuit 16 are numerous. For example, the interface circuit 16 provides a low power, low cost, compact input circuit having high voltage isolation and immunity to noise and leakage currents. In particular, the design reduces input power through sampling techniques and circuit complexity is reduced through multiplexing. This technique is readily expandable in both X and Y dimensions.

While a preferred embodiment of the subject invention has been shown and described herein in detail, those skilled in this art will recognize various alternative designs and embodiments for practicing the present invention as defined by the following claims.

What is claimed is:

1. An interface circuit for reading data to a programmable message display including a microprocessor for providing control signals, a message memory for storing multiple messages in a binary digit code and an electronic display device, the microprocessor being responsive to the output of the memory for causing the display device to display a message corresponding to the coded signal provided by the memory, the circuit comprising:
   a plurality of input circuits for receiving a like plurality of parallel input data signals, each of said input circuits being responsive to an isolated control signal to condition its respective input data signal;
   reference signal generating means responsive to at least two control signals from the microprocessor to provide at least first and second reference signals;
   a like plurality of comparator circuits, each of said comparator circuits being coupled to its respective input circuit and to said reference signal generating means, first and second banks of said comparator circuits sequentially comparing their respective conditioned input signals with the first and second reference signals, respectively; and
   at least first and second isolation circuits, each of said isolation circuits being coupled to the output of a single comparator circuit of each of the banks of the comparator circuits, the isolation circuits providing isolated output signals to the microprocessor corresponding to the level of the input data signals received by the input circuits.

2. The invention as claimed in claim 1 wherein each of said input circuits includes a voltage divider circuit adapted to receive one of the input data signals and adapted to be coupled to a supply voltage for shifting the input voltage range of its respective input data signal as a function of the voltage level of the supply voltage.

3. The invention as claimed in claim 2 wherein each of said input circuits further includes a terminating resistor coupled to its respective voltage divider circuit to provide a path for leakage current.

4. The invention as claimed in claim 3 further comprising enabling means responsive to at least one of the control signals from the microprocessor and coupled to each of said terminating resistors for providing said isolated control signals to enable said input circuits.

5. The invention as claimed in claim 4 wherein said enabling means includes a timer circuit responsive to the at least one control signal from the microprocessor to provide a timing control signal.

6. The invention as claimed in claim 5 wherein said enabling means further includes isolated switch means responsive to said timing control signal and adapted to be coupled to the supply voltage for enabling each of said terminating resisters, said switch means further providing the path for the leakage current.

7. The invention as claimed in claim 6 wherein each of said plurality of input circuits has a sink mode and a source mode and wherein said enabling means further includes selector means coupled with said isolated switch means for selecting one of the source and sink modes for the input circuits.

8. The invention as claimed in claim 7 further comprising a monitor circuit coupled with said selector means for monitoring the selection of the selector means and providing a feedback signal for the microprocessor, the feedback signal indicating the polarity of the input data signals.

9. The invention as claimed in claim 1 wherein each of said comparator circuits includes a comparator having a pair of inputs and an output and a hysteresis resister coupled between one of the inputs and the output to avoid false triggering of its respective comparator due to noise.

10. The invention as claimed in claim 9 wherein the output of the comparator is an open collector.

11. The invention as claimed in claim 1 wherein each of said isolation circuits includes a single opto-coupler.

12. The invention as claimed in claim 1 wherein said reference signal generating means includes an isolated analog switch for sequentially generating said first and second reference signals in response to the at least two control signals from the microprocessor.

13. The invention as claimed in claim 2 wherein the reference voltage generating means is adapted to be coupled to the supply voltage so that the first and second reference signals are a function of the voltage level of the supply voltage.

14. The invention as claimed in claim 12 wherein said reference voltage generating means further includes a voltage divider circuit coupled with the isolated analog switch and adapted to be coupled to the supply voltage, the first and second reference signals being a function of the voltage level of the supply voltage.

15. The invention as claimed in claim 7 wherein the selector means includes a jumper.

16. The invention as claimed in claim 15 wherein the jumper is adapted to be coupled to the supply voltage.

17. An interface circuit for reading data to a programmable message display including a microprocessor for providing control signals, a message memory for storing multiple messages in a binary digit code and an electronic display device, the microprocessor being responsive to the output of the memory for causing the display device to display a message corresponding to the coded signal provided by the memory, the circuit comprising:

a plurality of input circuits for receiving a like plurality of parallel input data signals, each of said input circuits being responsive to an isolated control signal to condition its respective input data signal;

enabling means responsive to at least one of the control signals from the microprocessor and coupled to each of the input circuits for providing the isolated control signal to enable said input circuits;

reference signal generating means responsive to at least two control signals from the microprocessor to provide at least first and second isolated reference signals;

a like plurality of comparator circuits, each of said comparator circuits being coupled to its respective input circuit and to said reference signal generating means, first and second banks of said comparator circuits sequentially comparing their respective conditioned input signals with the first and second reference signals, respectively; and at least first and second isolation circuits, each of said isolation circuits being coupled to the output of a single comparator circuit of each of the banks of the comparator circuits, the isolation circuits providing isolated output signals to the microprocessor corresponding to the level of the input data signals received by the input circuits.

18. The invention as claimed in claim 17 wherein said reference signal generating means includes an isolated analog switch for sequentially generating said first and second isolated reference signals in response to the at least two control signals from the microprocessor.

* * * * *